United States Patent

Zhou et al.

[11] Patent Number: 5,945,875
[45] Date of Patent: Aug. 31, 1999

[54] π/N SHIFT PHASE-SHIFT KEYING DEMODULATOR

[75] Inventors: Xuping Zhou; Guoliang Shou; Changming Zhou, all of Tokyo, Japan

[73] Assignee: Yozan Inc., Tokyo, Japan

[21] Appl. No.: 09/047,457

[22] Filed: Mar. 25, 1998

[30] Foreign Application Priority Data

Mar. 26, 1997 [JP] Japan ................................. 9-089911

[51] Int. Cl.$^6$ ............................. H03D 3/00; H04L 27/22
[52] U.S. Cl. .......................... 329/304; 329/306; 329/310; 375/324; 375/332
[58] Field of Search ................................. 329/304–310; 375/324, 329–333

[56] References Cited

U.S. PATENT DOCUMENTS 3,997,847 12/1976 Tong ....................................... 329/105

*Primary Examiner*—David Mis
*Attorney, Agent, or Firm*—Pillsbury Madison & Sutro LLP

[57] ABSTRACT

A π/n shift PSK demodulator of this invention is formed with a digital logical means through the following method. XOR4 calculates the ex-OR operation between the present sample through π/4 shift QPSK output from SH2 and the previous one output from SH1. Accumulating 1 among the outputs from XOR4 in the first operation means 5 and multiplying it by π/8 obtains the absolute phase difference between the present and the previous symbols. The former or latter four bits from SH1 are subtracted from the corresponding former or latter four bits from SH2, and the result of each bit is summed and its sign is added to the absolute phase data in sign addition means 10. After the phase offset is subtracted from the outputs from 10, it is demodulated into the original one in judgment circuit 13.

3 Claims, 6 Drawing Sheets

| Initial Input Phase | | Shift Register SH2 | | | | | | | |
|---|---|---|---|---|---|---|---|---|---|
| | | b0 | b1 | b2 | b3 | b4 | b5 | b6 | b7 |
| a | 0 | 1 | 1 | 1 | 1 | 0 | 0 | 0 | 0 |
| b | $-\pi/4$ | 0 | 1 | 1 | 1 | 1 | 0 | 0 | 0 |
| c | $-2\pi/4$ | 0 | 0 | 1 | 1 | 1 | 1 | 0 | 0 |
| d | $-3\pi/4$ | 0 | 0 | 0 | 1 | 1 | 1 | 1 | 0 |
| e | $-4\pi/4$ | 0 | 0 | 0 | 0 | 1 | 1 | 1 | 1 |
| f | $-5\pi/4$ | 1 | 0 | 0 | 0 | 0 | 1 | 1 | 1 |
| g | $-6\pi/4$ | 1 | 1 | 0 | 0 | 0 | 0 | 1 | 1 |
| h | $-7\pi/4$ | 1 | 1 | 1 | 0 | 0 | 0 | 0 | 1 |

π/N SHIFT PHASE-SHIFT KEYING DEMODULATOR

FIELD OF THE INVENTION

The present invention relates to a π/n shift phase-shift keying demodulator for demodulating the signal modulated through π/n shift phase-shift keying.

BACKGROUND OF THE INVENTION

π/4 shift quadrature phase-shift keying (QPSK) is known for narrowing bandwidth in digital demodulating systems. It does this without code interference by using a Nyquist filter. The linearly-modulated frequency is efficiently used, the signal phase locus is controlled by a differential identifier and a signal point-mapping circuit so as not to pass through the origin, and the envelope changes less than that of QPSK to be resistant to influence of non-linearity. Therefore, using a mid-class non-linear amplifier heightens electric power efficiency. Even when fading changes the received wave phase, π/4 shift QPSK blunts high-speed fading by applying delay detection.

FIG. 8 shows a π/4 shift QPSK signal spatial diagram. Phase-change quantity in QPSK is 0, π/2, π and 3π/2. When the phase changes by π, the signal phase locus passes through the origin, which produces a large envelope change if its bandwidth is limited. On the other hand, in π/4 shift QPSK the signal phase locus does not pass through the origin, and so the envelope change is small, which makes this method curtail non-linear influence.

In FIG. 8, the π/4 shift QPSK signal point is alternately selected among the QPSK signal points of 0, +−π/2 and π shown by white circles and the π/4 shift QPSK signal points of +−π/4 and +−3π/4 shown by black circles: the phase-shift is limited to +−π/4 and +−3π/4. That is, the minimum phase-shift magnitude is π/4.

FIG. 9 shows a conventional demodulation circuit for demodulating input signals modulated by π/4 shift QPSK.

In FIG. 9, the received signal is converted into IF signal at a previous stage not shown, and supplied to phase-detection circuit 100. Circuit 100 detects the IF signal instantaneous phase by a signal from local oscillator 101 and outputs the phase quantity as the phase output. This phase output is sent to phase difference circuit 102 as the first input and also sent to delay circuit 103 for delaying the cycle by one symbol. Circuit 102 receives the output of 103 as the second input, and so it analogously calculates the phase difference between the output of the present symbol and of the previous one to be output. This phase difference output is supplied to judging circuit 104, and its demodulated data is output.

Circuit 104 outputs data 0, 10, 01 and 11 when the phase differential output is around π/4, −π/4, 3π/4 and −3π/4, respectively, which can demodulate the input signal modulated by π/4 shift QPSK.

SUMMARY OF THE INVENTION

Conventional circuit size is large for demodulating the input signals modulated by π/4 shift QPSK. Especially when complex conjugates at present and past symbols are multiplied in the phase-detection circuit 100, the complex number multiplication should be performed in a digital signal processor (DSP). Consequently, the circuit is both large and costly.

The present invention has an object to provide a simplified and small-sized π/n shift PSK demodulator with low power consumption.

To achieve the above object, the present π/n shift PSK demodulator comprises i) a hard limiter for hard-limiting input signals modulated by π/n shift PSK modulator, ii) a sampling means for over-sampling by a clock at least 2n times as frequent as the input signal symbol rate when the minimum unit phase-shift magnitude in the π/n shift PSK demodulator is π/n (n is the second power), iii) a symbol-holding means consisting of a first holding means for holding a symbol oversampled by the sampling means and a second holding means for holding the previously oversampled symbol, iv) a first operation means for calculating the absolute phase difference between symbols stored in the first and second holding means by detecting disagreement between each of the 2n samples stored therein, v) a second operation means for performing logical operations on the former or latter n number of samples in the first and second holding means, and outputting a sign of the operation as the sign data of the absolute phase difference above mentioned, and vi) a judging means for outputting demodulated data by judging the phase difference data with added signs after adding the sign data output from the second operation means to the absolute phase difference data output from the first operation means.

The first operation means performs ex-OR on each corresponding 2n sample stored in the first and second holding means, accumulates the operation result number with the value one, and multiplies π/(2n) by the accumulated value to obtain the absolute phase difference.

The second operation means outputs the sign data through operations in cases A) to D) as below.

A) When AND between the first and last samples of the symbol stored in the first holding means is 0, and that between the first and the last samples of the symbol stored in the second holding means is 0, each sample logical value in the former n samples stored in the second holding means is subtracted from each sample logical value in the former n samples stored in the first holding means, and each subtraction value is accumulated and its sign is output as the sign data.

B) When AND between the first and last samples of the symbol stored in the first holding means is 1, and that between the first and the last samples of a symbol stored in the second holding means is 1, each sample logical value in the latter n samples stored in the second holding means is subtracted from each sample logical value in the latter n samples stored in the first holding means, and each subtraction value is accumulated and its sign is output as the sign data.

C) When AND between the first and last samples of the symbol stored in the first holding means is 0, and that between the first and the last samples of the symbol stored in the second holding means is 1, each sample logical value in the former n samples stored in the second holding means is subtracted from each sample logical value in the latter n samples stored in the first holding means, and each subtraction value is accumulated and its sign is output as the sign data.

D) When AND between the first and the last samples of the symbol stored in the first holding means is 1, and that between the first and last samples of the symbol stored in the second holding means is 0, each sample logical value in the latter n samples stored in the second holding means is subtracted from each sample logical value in the former n samples stored in the first holding means, and each subtraction value is accumulated and its sign is output as the sign data.

The present invention is capable of making a simplified and small-sized π/n shift PSK demodulator with low power consumption because it can demodulate signals using a digital logic method.

PREFERRED EMBODIMENT OF THE PRESENT INVENTION

Figure 1:
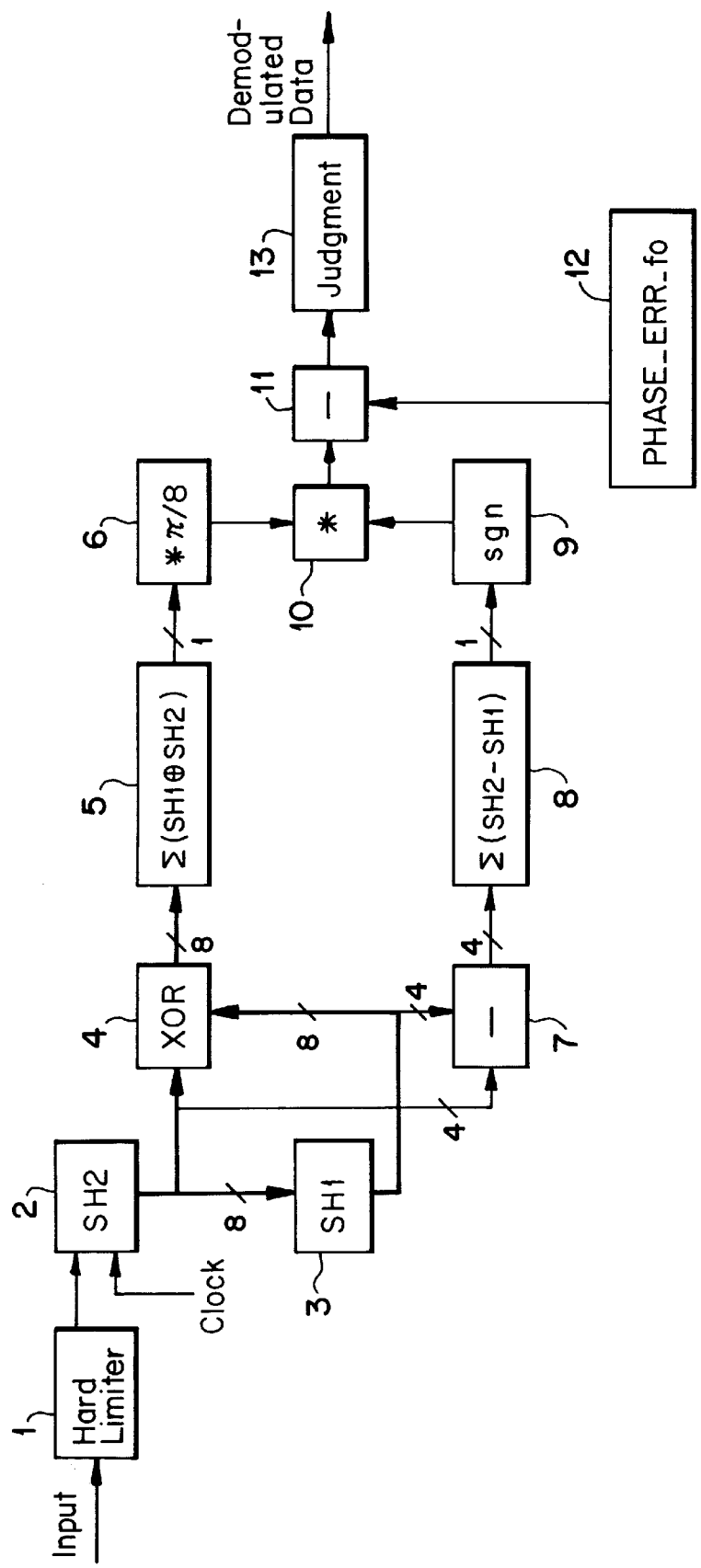
FIG. 1 shows a block diagram of the first embodiment of a π/4 shift QPSK demodulator of the present invention.

FIG. 1 shows a block diagram of the first embodiment of the present π/n shift PSK demodulator, applied to a π/4 shift QPSK demodulator.

In FIG. 1, 1 is a hard limiter for forming input signals into a pulse wave, 2 is the second shift register SH2 storing a symbol including eight samples which are oversampled by a clock at eight times the input signal symbol rate, 3 is the first shift register SH1 storing a symbol of each previous one-symbol cycle including the eight oversampled samples, and 4 is an ex-OR circuit (XOR) for operating ex-OR between each of the corresponding eight samples stored in SH2 and SH1.

Number 5 is the first operation means for accumulating operation results with the logical value 1 from among the output from XOR4, 6 is a phase-shift data output circuit for outputting the absolute phase difference between the symbol stored in the second shift register SH2 and the symbol stored in the first shift register SH1 by multiplying the accumulated value from 5 with π/8, and 7 is the first subtracter for subtracting each of the former or latter four samples of the symbol in SH1 from the corresponding former or latter four in SH2. Number 8 is the second operation means for accumulating the subtracted values of samples from 7, and 9 is a code outputting means for outputting the code data "+" or "−" of the accumulated value output from 8.

The first operation means 5 is realized by counting the number 1 with an up-counter, and the second operation means 8 is realized by a preset up-down-counter by presetting the offset value in this preset up-down-counter before counting, up-counting the number 1 in the former or latter four samples of SH2, and down-counting the number 1 in the former or latter four samples of SH1. Here, when the remainder in the down-counter is larger than the offset value, 8 outputs the "+" sign, and when smaller, 8 outputs the "−" sign. Any value can be adopted as the offset value unless the down-counter makes this value a negative. In the four-sample subtractions above, signs are most simply judged when the offset value is 1000 of the binary number: judgment only by the most significant bit (MSB) value makes good results. In this case, the offset value should be preset by every eight samples in the preset up-down-counter.

Number 10 is a sign addition means for adding signs output from the phase shift data output circuit 6 to the data output from 9, 11 is the second subtracter for canceling the phase offset between the symbol rate and input signal center frequency fo, 12 is a phase offset generating means for outputting phase offset PHASE_ERR_fo of fo, and 13 is a judging circuit for outputting demodulated data according to the phase-shift data output from 11. Here, 11 can be realized by the same method same as that of the first subtracter 7.

Figure 2:
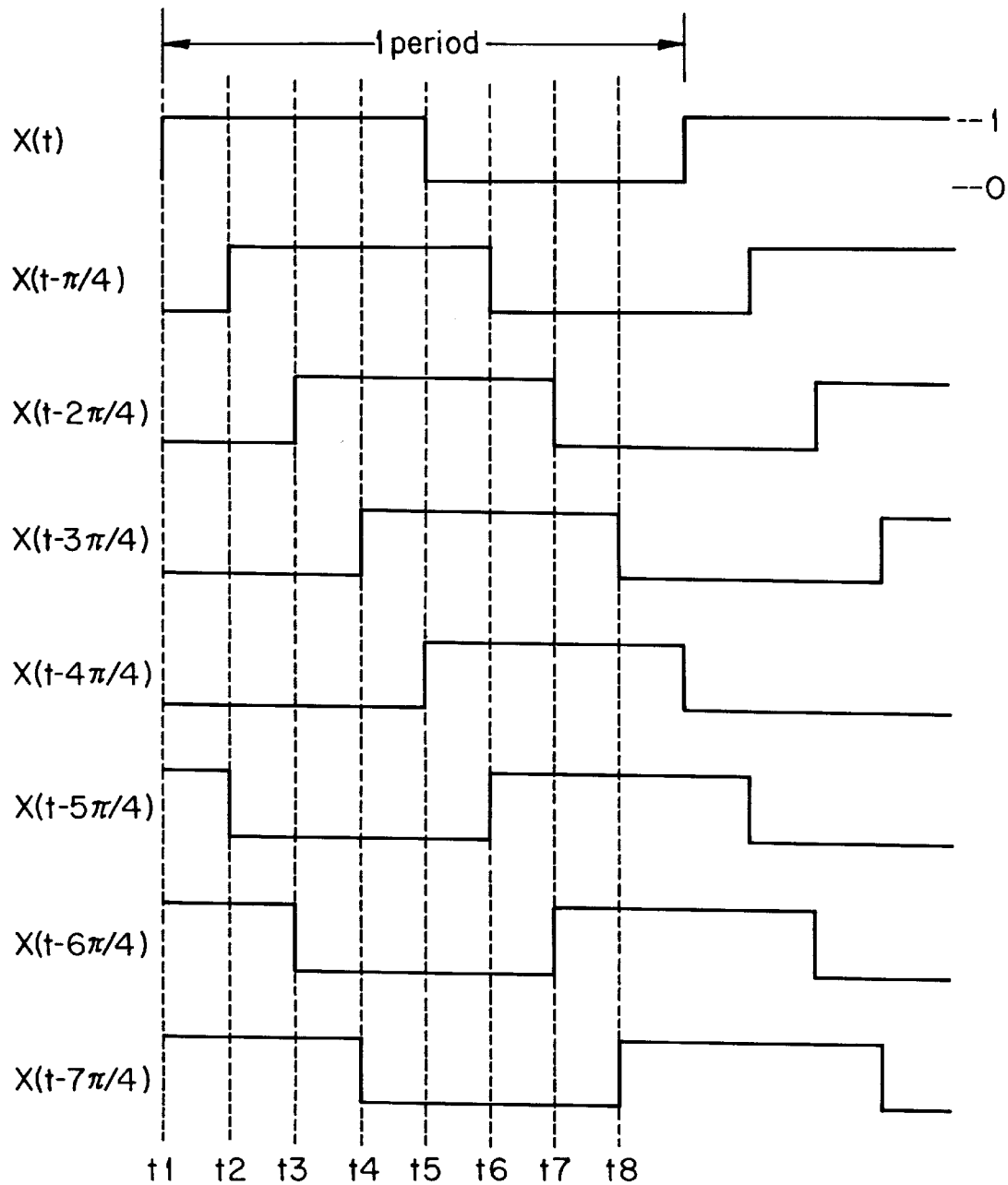
FIG. 2 shows a timing chart for sampling symbols delayed with the π/4 unit.
Figures 3, 4:
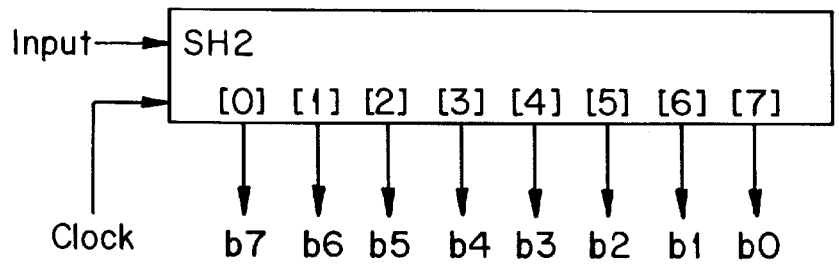
FIG. 3 shows the second shift-register SH2 in the π/4 shift QPSK demodulator of this invention.
FIG. 4 shows sampled values of the symbols delayed with the π/4 unit in FIG. 2.
Figure 5:
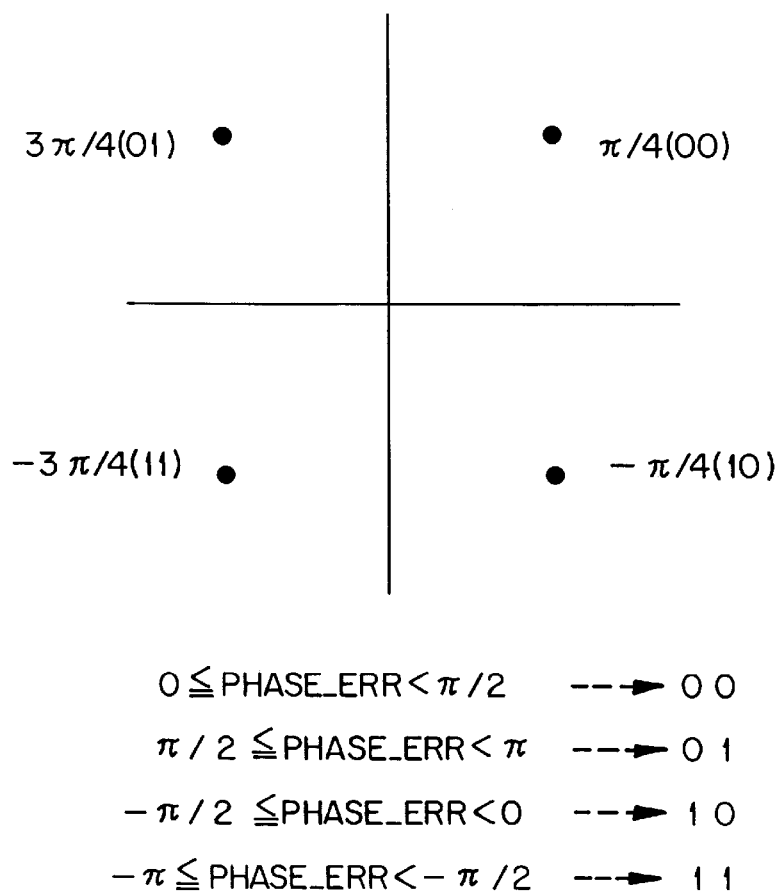
FIG. 5 shows signal points for explaining the actions of the judgment in the π/4 shift QPSK demodulator of the present invention.

The action of the π/4 shift QPSK demodulator in FIG. 1 is described with reference to FIGS. 2 to 5. FIG. 2 shows a timing chart of the situation for sampling symbols with (π/4)-delayed phase, FIG. 3 shows the configuration of the second shift register SH2, FIG. 4 shows a table of values sampled by a clock eight times as frequent as the symbol rate, and FIG. 5 shows the signal point arrangement for explaining the function of 13.

Figure 8:
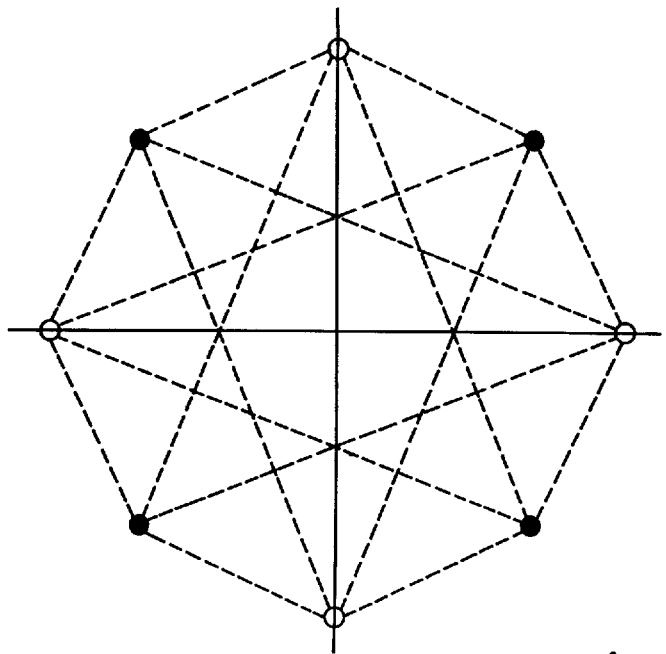
FIG. 8 shows a π/4 shift QPSK signal spatial diagram.
Figure 9:
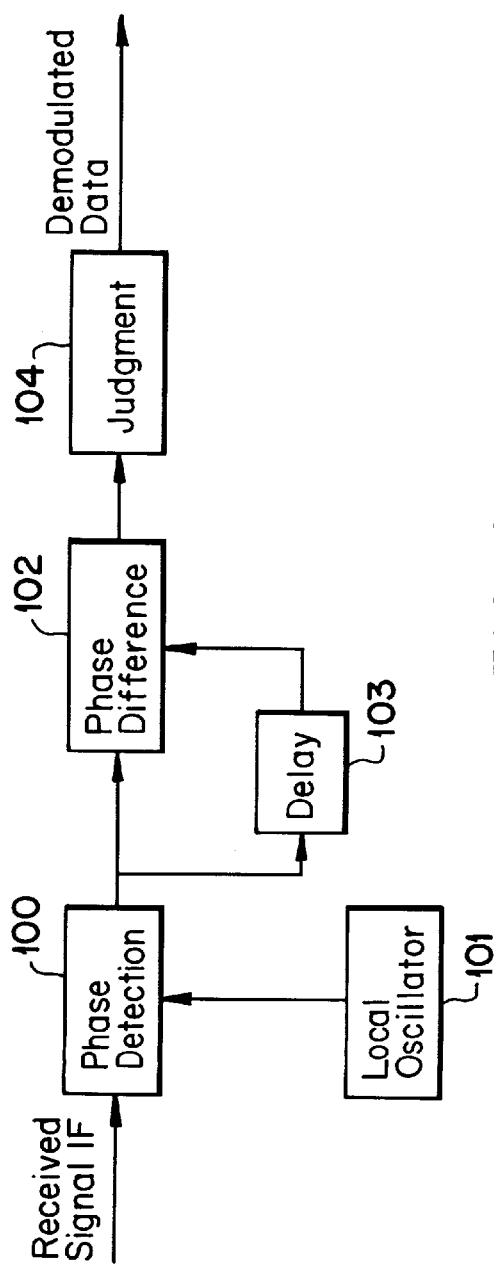
FIG. 9 shows an example of the demodulating circuit for demodulating signals performed π/4 shift QPSK.

In the π/4 shift QPSK, there are eight signal points, each of which has phases gradually shifted by π/4 as shown in FIG. 8. The signals output from hard limiter 1 in FIG. 1 are rectangular in shape and are input signals with eight phases from X(t) to X(t−7π/4) in FIG. 2. X(t) is shown in formula (1):

$$X(t)=\sin(\theta(t))=\sin(2\pi f_0 t + \phi n) \quad (1)$$

Here, fo is the center frequency of the input signals, and φn is the phase quantity decided by the π/4 shift QPSK modulation rule.

The input signal in formula (1) is supplied to the second shift register SH2 in FIG. 3 and is sampled by the clock signal supplied to the clock terminal. This clock interval is ⅛ of one symbol cycle in FIG. 2; that is, it is eight times the frequency of the symbol rate. Symbols are sampled at the eight points t1, t2, . . . t8. Therefore, the number of samples is eight per symbol. The relationship between the sample value and the initial input phase of the sample is shown in FIG. 4.

In FIG. 4, a to h are the inputs through π/4 shift QPSK with the minimum unit phase-shift magnitude π/4, and the input sampled by the clock with eight times the frequency length of the symbol rate is shown by 8-bit values from b0 to b7. For example, when the input has the phase-shift magnitude 0 at a, the 8-bit value of the sample is "11110000", when it has −π/4 at b, the value is "01111000", and when it has −2π/4 at c, the value is "00111100": the location of 1 in sample-values is shifted according to the input signal phase-shift magnitude.

Consequently, when the phase of the symbol just input is a and of that previously input is b, SH2 and SH1 receive bits b0 to b7 in line a and bits b0 to b7 in line b, respectively, as shown in FIG. 4. XOR4 operates ex-OR between the 8 bits in SH2 and the locally-corresponding 8 bits in SH1, and outputs 8-bit data "10001000" in parallel. Here, the absolute phase difference between the current and previous symbols is π/4, and the number with the value 1 in the data output from XOR4 is 2. When the accumulation value of ex-OR data is expressed by SUM_XOR, SUM_XOR=2.

When the phases of the symbols input presently and previously are a and h, respectively, SH2 and SH1 receive bits b0 to b7 in line a and b0 to b7 in line h, respectively, as in FIG. 4. XOR4 operates ex-OR between 8 bits in SH2 and the locally corresponding 8 bits in SH1, and outputs 8-bit data "00010001" in parallel. Here, the absolute phase difference between the present and previous symbols is also π/4, and the number with the value 1 in the data output from XOR4 is also 2. That is, SUM_XOR=2.

When the phases of the symbols input presently and previously are a and h, respectively, SH2 and SH1 receive bits b0 to b7 in line c and b0 to b7 in line h, respectively, as in FIG. 4. XOR4 operates ex-OR between the 8 bits in SH2 and the locally corresponding 8 bits in SH1, and outputs 8-bit data "11011101" in parallel. Here, the absolute phase difference between the present and previous symbols is 3π/4, and the number with the value of 1 in the data output from XOR4 is 6. That is, SUM_XOR=6.

It is clear XOR4 outputs the number of 1 corresponding to the absolute phase difference between symbols presently and previously input. That is, the absolute phase difference between symbols presently and previously input can be obtained by operating SUM_XOR through the accumulation of 1s output from XOR4.

The absolute phase difference data between symbols presently and previously input is output from the first operation means 5 by calculating SUM_XOR through the accumulation of 1 from XOR4 in 5, and supplying the value to phase-shift data output circuit 6. This accumulation can be realized by a 3-bit up-counter with a reset necessity every 8 clock cycles.

The absolute phase difference data (PHASE_ERR_ABS) is expressed by formula (2):

$$\text{PHASE\_ERR\_ABS} = \text{SUM\_XOR} * \pi/\text{nsm} \quad (2)$$

Here, nsm is the output bit number (bit numbers in a symbol) of SH1 or SH2: it is 8, in the above case.

The absolute phase difference data in formula (2) is obtained by supplying the output of 5 to 6 to be multiplied by π/8. The absolute phase difference data output from 6 is supplied to sign addition means 10 to be given the sign of the data output from sign output circuit 9. That is, the absolute phase difference data is output through the phase-shift magnitude between the present and previous symbols by XOR4, the first operation means 5 and phase-shift data output circuit 6.

First subtracter 7 subtracts the former or latter four bits of SH1 from the corresponding bits of SH2. The 4-bit subtraction value output from 7 is supplied to the second operation means 8 to be accumulated. The + or − sign of the accumulation of the subtraction value is detected in sign detecting means (sgn) 9. In short, the sign of phase-shift between present and previous symbols is detected through 7, 8 and 9.

Four processing types exist for detecting signs as below.

CASE 1

When AND between bits b0 and b7 of the symbol previously input to SH1 is 0, and that of the symbol presently input to SH2 is 0, the former four bits (b0 to b3) output from SH1 are subtracted from every corresponding bit output from SH2 in the first subtracter 7, and the subtraction values are added. Assuming the addition value is DIFF in this description, the sign of DIFF is that of the phase-shift magnitude.

DIFF in CASE 1 is expressed by formula (3):

$$DIFF = \sum_{j=0}^{nsm/2-1} (SH2[j] - SH1[j]) \quad (3)$$

Here, SH1[j] and SH2[j] are the j-th output bit of SH1 and SH2, nsm is the number of output bits (single-symbol bit number) of SH1 and SH2.

To execute the calculation in formula (3) with 4-bit preset up-down counter, the offset value is "1000", the number of 1s from SH2[0] to SH2[3] is up-counted by the four former clocks, and that from SH1[0] to SH1[3] is down-counted by the four latter clocks. After eight clock cycles, when the MSB of the counter is 1, + is output, and when it is 0, − is output.

CASE 2

When AND between bits b0 and b7 of the symbol previously input to SH1 is 1, and that of the symbol presently input to SH2 is 1, the latter four bits (b4 to b7) output from SH1 are subtracted from every corresponding bit output from SH2 in subtracter 7, and the subtraction values are added. Assuming the addition value is DIFF, its sign is that of the phase-shift magnitude.

DIFF in CASE 2 is expressed by formula (4):

$$DIFF = \sum_{j=nsm/2}^{nsm-1} (SH2[j] - SH1[j]) \quad (4)$$

To execute the calculation in formula (4) with a preset up-down counter, its offset value is "1000", the number of 1 in SH2[4] to SH2[7]) is up-counted by the four former clocks, and that of SH1[4] to SH1[7] is down-counted by the four latter clocks. The sign judgment after eight clocks is the same as that of case 1.

CASE 3

When AND between bits b0 and b7 of the symbol previously input to SH1 is 1, and that of the symbol presently input to SH2 is 0, the former four bits (b0 to b3) output from SH1 are subtracted from the latter four bits (b4 to b7) output from SH2 on every corresponding bit in subtracter 7, and the subtraction values are added. Assuming the addition value is DIFF, its sign is that of the phase-shift magnitude.

DIFF in CASE 3 is expressed by formula (5):

$$DIFF = \sum_{j=nsm/2}^{nsm-1} (SH2[j] - SH1[j - nsm/2]) \quad (5)$$

To execute the calculation in formula (5) with a preset up-down counter, its offset value is "1000", the number of 1s from SH2[4] to SH2[7] is up-counted by the four former clocks, and that from SH1[0] to SH1[3] is down-counted by the four latter four clocks. The sign judgment is the same as that in case 1.

CASE 4

When AND between bits b0 and b7 in the symbol previously input to SH1 is 0, and that of the symbol presently input to SH2 is 1, the latter four bits (b4 to b7) output from SH1 are subtracted from the former four bits (b0 to b3) output from SH2 on every corresponding bit in subtracter 7, and the subtraction values are added. Assuming the addition value is DIFF, its sign is that of the phase-shift magnitude.

DIFF in CASE 4 is expressed by formula (6):

$$DIFF = \sum_{j=nsm/2}^{nsm-1} (SH2[j - nsm/2] - SH1[j]) \quad (6)$$

To execute the calculation in formula (6) with a preset up-down counter, its offset value is "1000", the number of 1s from SH2[0] to SH2[3] is up-counted by the four former clocks, and that of SH1[4] to SH1[7] is down-counted by the four latter clocks. The sign judgment is the same as that in case 1.

Completing one of these four processing cases according to the situation decides the phase-shift sign between both symbols using the sample values of the present symbol sampled in SH2 and of the previous symbol sampled in SH1. The decided phase-shift sign is provided to sign addition means 10 and added to the absolute phase difference between the symbols presently and previously input. Then 10 outputs the phase difference data between them with sign. The second subtraction means 11 subtracts phase offset PHASE_ERR_fo, which is the difference between symbol rate R and the center frequency fo, from the phase difference data. Judging which signal point has the phase difference digital value with PHASE_ERR_fo subtracted obtains the demodulated data of the input signal modulated by π/4 shift QPSK.

Judgment circuit 13 executes the judgment and outputs 2-bit digital data as the demodulated data corresponding to the judged signal point among +−π/4 and +−3π/4 in FIG. 5. For example, when the judged signal point is π/4, demodulated data (00) is output, and when it is −3π/4, demodulated data (11) is output. PHASE_ERR in FIG. 5 is the phase difference data with the sign above. As 13 receives this phase difference data in digital form, it can be easily judged to which one of the four signals data corresponds.

The second subtraction means 11 provided between 10 and 13 serves to cancel the phase offset caused by the center frequency fo, which is added to every symbol when R and fo have no integer multiplication relationship with each other. For example, R=192ksymbol/s and fo=10.8 MHz, PHASE_ERR_fo is as below:

PHASE_ERR_fo=2* π*fo/R=π/2

That is, as π/2 phase offset is given to every symbol, generating PHASE_ERR/fo in offset generator 12 and supplying it to 11 cancels the phase offset.

When phase offset is cancelled by a circuit, the multiplication in phase-shift data output circuit 6 and the subtraction in 11 are realized by the shift register and preset down-counter, respectively, after deleting the common term π of the phase difference between phase offset generating means 12 and phase-shift data output circuit 6.

In the first embodiment above, the sample value initially set in first shift-register SH1 is "11110000".

The frequency clock for sampling symbols is not limited to eight times the frequency of the symbol rate as in the above description. It may continue doubling to 16, 32, or 64 times, or higher: raising the clock frequency improves resistance to noise. When the minimum phase-shift magnitude in π/n shift PSK modulation is π/n, the clock frequency may be at least 2n times larger than the symbol rate R.

Figure 7:
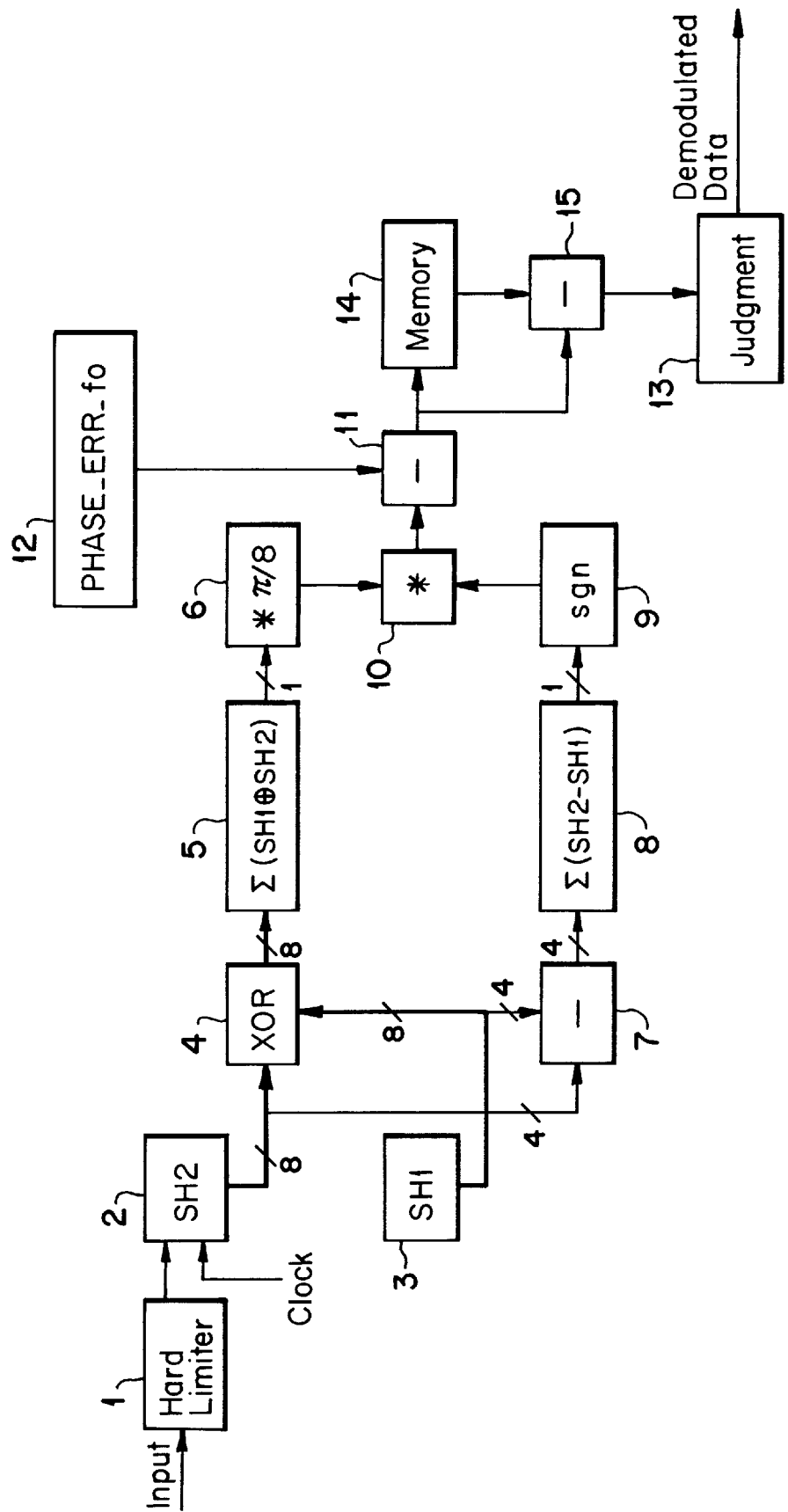
FIG. 7 shows a block diagram of the second embodiment of the π/4 shift QPSK demodulator of the present invention.

FIG. 7 shows the second embodiment of a π/n shift QPSK demodulator in which the present invention is employed in a π/4 shift QPSK demodulator. The blocks shown with the same marks in FIG. 1 are the same portions.

In the second embodiment in FIG. 7, the eight bits stored in SH1 correspond to the fixed symbol instead of the previous symbol. Although the eight sample values of the fixed symbol are stored in SH1—for example, "11110000"—there may be other line patterns as in FIG. 4. XOR4 receives eight bits of the symbol oversampled by a clock timing of eight times larger frequency than the symbol rate as well as eight bits of the fixed symbol. The number of 1s is output from XOR4 according to the absolute phase difference between the symbols.

That is, the absolute phase difference between the symbol presently input and the fixed one is calculated by accumulating the number of 1s output from XOR4, as in the first embodiment.

The absolute phase difference between the symbol presently input from the first operation means 5 and the fixed one is output by calculating the accumulation value SUM_XOR through accumulation of the number of 1s output from XOR4 in 5, and by supplying SUM_XOR to phase-shift data output circuit 6.

The absolute phase difference data (PHASE_ERR_ABS) is expressed by formula (2), which is obtained by providing the output of 5 to 6 to be multiplied by π/8. The absolute phase difference data is output from 6 to sign addition circuit 10 to be added to the sign data from sign output circuit 9. In sum, the absolute phase difference data is output by detecting the phase-shift magnitude of the present symbol and fixed symbol by XOR4, the first operation means 5 and phase-shift data output circuit 6.

First subtracter 7 subtracts the former or latter four bits in SH1 from the corresponding former or latter four bits in SH2, with respect to each corresponding pair. The four-bits subtraction outputs from 7 is supplied to the second operation means 8 to be accumulated in every bit. Sign detection means (sgn) 9 detects the + or − sign of the accumulation of the subtraction values. In short, the phase-shift signs of the present and fixed symbols are detected by 7, 8 and 9.

Two processing types exist for detecting signs as below.

CASE 1

When AND between bits b0 and b7 from SH2 is 0, the former four bits (b0 to b3) output from SH2 are subtracted from the fixed former four bits "1111" output from SH1 in the first subtracter 7 with respect to every corresponding bit, and the subtraction values are added. Assuming the addition value is DIFF, the sign of DIFF is that of the phase-shift magnitude. In this case, this sign is always negative, and input signal is judged to have delayed phase. DIFF in this CASE 1 is expressed by formula (3) above.

CASE 2

When AND between bits b0 and b7 from SH2 is 1, the fixed latter four bits "0000" output from SH1 are subtracted from the latter four bits (b4 to b7) output from SH2 in 7 with respect to every corresponding bit, and the subtraction values are added. Assuming the addition value is DIFF, the sign of DIFF is that of the phase-shift magnitude. In this case, this sign is always positive, and input signal is judged to have advanced phase. DIFF in CASE 2 is expressed by formula (4) above.

Carrying out one of these two processing cases according to the situation decides the phase-shift sign between both symbols using the sample values of the present symbol sampled in SH2 and of the fixed symbol stored in SH1. The decided phase-shift sign is provided to sign addition means 10 to be added to the absolute phase difference between the fixed symbol and that presently input. Then 10 outputs the phase difference data between them with signs. The second subtraction means 11 subtracts phase offset PHASE_ERR_fo, which is the difference between symbol rate R and the center frequency fo, from the phase difference data.

The phase difference data of the symbol presently input is obtained by subtracting the phase difference data of the symbol previously input from that output from 11 in third subtracter 15, to which the phase difference data from 10 and that of the symbol previously input with one symbol delay are input. The π/4 shift QPSK-modulated data is demodulated by judging which signal point has the phase difference digital value that is calculated by subtracting the phase difference of the symbol previously input from that presently input after being output from 15.

Judgment circuit 13 executes the judgment and outputs 2-bit digital data as the demodulated data corresponding to the judged signal point among +−π/4 and +−3π/4 shown in FIG. 5, like the first embodiment. For example, when the judged signal point is π/4, demodulated data (00) is output, and when it indicates −3π/4, demodulated data (11) is output. The second subtraction means 11 provided between 10 and 14, as in the first embodiment, serves to cancel the phase offset caused by the center frequency fo, which is added to every symbol when R and fo have no integer multiplication relationship with each other. That is, generating phase offset PHASE_ERR_fo in offset generator 12 and supplying it to the subtraction means 11 cancels phase offset.

The sample value initially set in SH1 in the second embodiment is "11110000": changing it requires a sign calculation as in case 1 or 2 above.

The clock frequency for sampling symbols is not limited eight times larger than that of the symbol rate as in the above description. It may continue doubling to 16, 32, or 64 times, or higher. Raising the clock frequency improves the resistance to noise. When the minimum phase-shift magnitude in π/n shift PSK modulation is π/n, the clock frequency should be at least 2n times and $2^n$ times as frequent as R.

Second embodiment components 5, 6, 8, 9, 10, 11, 12, 13 and 15 can be realized with the same structure as the corresponding circuits in the first embodiment.

The present invention is not limited to the π/4 shift QPSK demodulator described in the first and second embodiments. It can utilize a π/8 shift QPSK demodulator, a π/16 shift QPSK demodulator, up to a π/n shift QPSK demodulator, where n is the power of two.

In the first and second embodiments, the demodulators can be formed with simple configurations of registers and various logical gates.

Figure 6:
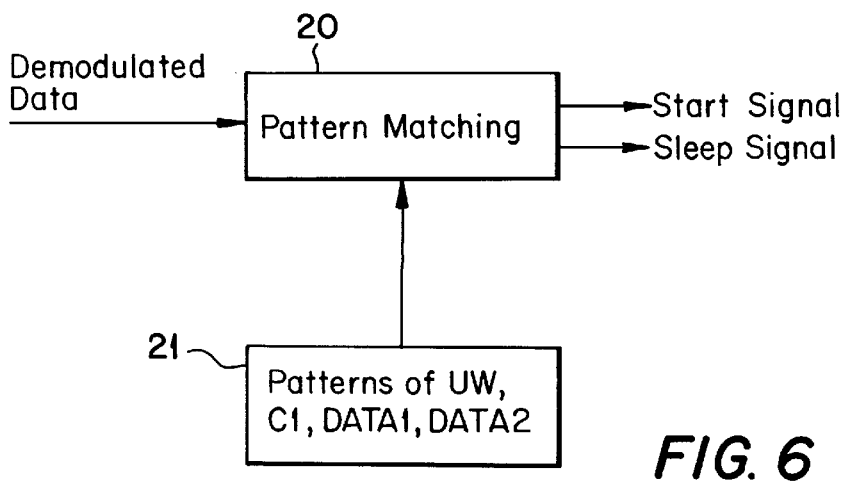
FIG. 6 shows a configuration in which the π/4 shift QPSK demodulator of the present invention is applied to a waiting circuit.

FIG. 6 shows a variation of the π/n shift PSK demodulator according to the present invention, where this demodulator is applied to a waiting circuit in a wireless communication system.

This waiting circuit, for example in a Personal Handyphone System (PHS), detects whether the function started on the predetermined timing and messages for the person are received or not. The data demodulated in the π/n shift PSK demodulator is supplied to pattern-matching circuit 20. In 20, demodulated data patterns, known unique words (UW), channel variety (CI), and changeable data DATA1 and DATA2 are read out from memory 21 and judged for identical patterns. Patterns judged to be identical are output from 20 and provided to the PHS control means; simultaneously, the sleep signal is cancelled.

When the patterns are not identical, starting signals are not output from 20. Instead, the sleep signal is output, and then the control means in the waiting circuit and the PHS is in sleeping condition.

The UW and CI are fixed patterns of 32 bits and 4 bits, respectively. For example, DATA1 and DATA2 are changeable data of 31 bits and 24 bits, respectively, and DATA1 is structured with data for calling services and identification number of personal station.

The present invention with the configuration above can demodulate data using digital logical methods and a simple and small-size π/n shift PSK demodulator. Low power consumption can be achieved in this π/n shift PSK demodulator.

What is claimed is:

1. A π/n shift phase-shift keying (PSK) demodulator comprising:

i) a hard limiter for hard-limiting input signals modulated by π/n shift PSK modulator;

ii) a sampling means for oversampling by a clock frequency at least 2n times larger than that of the input signal symbol rate when the minimum unit phase-shift magnitude in said π/n shift PSK modulator is π/n (n is the power of two);

iii) a symbol-holding means consisting of a first holding means for holding a symbol over-sampled by said sampling means and a second holding means for holding the previously over-sampled symbol;

iv) a first operation means for calculating the absolute phase difference between symbols stored in said first and second holding means by detecting disagreement between each of the 2n samples stored in said first and second holding means;

v) a second operation means for performing logical operations on the former or latter n number of samples output 2n samples in said first holding means and the former or latter n number of samples out of 2n samples stored in said second holding means, and outputting a sign of said operations as the sign data of said absolute phase difference; and vi) a judging means for outputting demodulated data by judging the phase difference data with added signs after adding the sign data output from said second operation means to said absolute phase difference data output from said first operation means.

2. A π/n shift PSK demodulator as claimed in claim 1, wherein said first operation means performs exclusive-or (ex-OR) processing on each corresponding 2n sample stored in the first and second holding means, accumulates the operation result number with the value 1, and multiplies π/(2n) by the accumulated value to obtain the absolute phase difference.

3. A π/n shift PSK demodulator as claimed in claim 1, wherein said second operation means outputs said sign data through operations in cases A) to D) as follows:

A) when conjunction (AND) between the first and last samples of the symbol stored in said first holding means is 0 and that stored in said second holding means is 0, each sample logical value in the former n samples stored in said second holding means is subtracted from each sample logical value in the former n samples stored in said first holding means, each subtraction value is accumulated and its sign is output as the sign data;

B) when AND between the first and last samples of the symbol stored in said first holding means is 1 and that for said second holding means is 1, each sample logical value in the latter n samples stored in said second holding means is subtracted from each sample logical value in the latter n samples stored in said first holding means, each subtraction value is accumulated and its sign is output as the sign data;

C) when AND between the first and last samples of a symbol stored in said first holding means is 0 and that for said second holding means is 1, each sample logical value in the former n samples stored in said second holding means is subtracted from each sample logical value in the latter n samples stored in said first holding means, each subtraction value is accumulated and its sign is output as the sign data; and D) when AND between the first and last samples of a symbol stored in said first holding means is 1 and that for said second holding means is 0, each sample logical value in the latter n samples stored in said second holding means is subtracted from each sample logical value in the former n samples stored in said first holding means, each subtraction value is accumulated and its sign is output as the sign data.

* * * * *